United States Patent
Chung et al.

(10) Patent No.: US 9,195,502 B2
(45) Date of Patent: Nov. 24, 2015

(54) AUTO DETECTING SHARED LIBRARIES AND CREATING A VIRTUAL SCOPE REPOSITORY

(75) Inventors: Albert A. Chung, Cary, NC (US); Christopher F. Markes, Winchester (GB); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 13/538,707

(22) Filed: Jun. 29, 2012

(65) Prior Publication Data

US 2014/0007104 A1 Jan. 2, 2014

(51) Int. Cl.
*G06F 9/46* (2006.01)
*G06F 9/50* (2006.01)
*G06F 9/445* (2006.01)

(52) U.S. Cl.
CPC ............... *G06F 9/5005* (2013.01); *G06F 8/61* (2013.01); *G06F 9/44521* (2013.01)

(58) Field of Classification Search
CPC .................................................... G06F 9/4843
USPC ......................................................... 718/100
See application file for complete search history.

(56) References Cited

U.S. PATENT DOCUMENTS

| | | | |
|---|---|---|---|
| 6,708,330 B1 * | 3/2004 | Moberg et al. ................ | 717/158 |
| 6,874,148 B1 * | 3/2005 | Richardson et al. .......... | 719/328 |
| 6,957,422 B2 | 10/2005 | Hunt | |
| 7,870,536 B2 * | 1/2011 | Banavar et al. ............... | 717/100 |
| 7,882,221 B2 | 2/2011 | Sailer et al. | |
| 7,984,429 B2 | 7/2011 | Hunt | |
| 2005/0086641 A1 * | 4/2005 | Hussey ......................... | 717/121 |
| 2008/0301710 A1 * | 12/2008 | Shetty .......................... | 719/316 |
| 2010/0049735 A1 * | 2/2010 | Hsu ............................ | 707/103 R |
| 2010/0205593 A1 * | 8/2010 | Bosschaert et al. .......... | 717/166 |
| 2010/0262694 A1 | 10/2010 | Havernose | |
| 2011/0184990 A1 * | 7/2011 | Murphy et al. ............... | 707/791 |
| 2011/0185429 A1 | 7/2011 | Sallam | |
| 2011/0202927 A1 | 8/2011 | Miloushev et al. | |
| 2011/0239227 A1 | 9/2011 | Schaefer et al. | |
| 2012/0278902 A1 * | 11/2012 | Martin et al. .................... | 726/28 |
| 2013/0073901 A1 * | 3/2013 | Syrgabekov et al. ........ | 714/6.24 |

OTHER PUBLICATIONS

Comer et al., "A New Design for Distributed Systems: The Remote Memory Model," Purdue University e-Pubs, Computer Science Technical Reports, Apr. 27, 1990.

(Continued)

*Primary Examiner* — Emerson Puente
*Assistant Examiner* — Charlie Sun
(74) *Attorney, Agent, or Firm* — Thomas E. Tyson; Gregory K. Goshorn; Greg Goshorn, P.C.

(57) ABSTRACT

Provided are techniques for receiving a request to load a first resource corresponding to an application onto a computing system for execution; determining whether or not the first resource is identical to a resource loaded in a virtual scope library (VSR); and, if the first resource is determined not to be identical to any particular resource loaded in the VSR, load the first resource into the VSR; and direct references to the first resource in the application to the first resource loaded in the VSR; and otherwise, if the first resource is determined to be identical to the second resource, direct references to the first resource in the application to the particular resource stored in the VSR.

15 Claims, 5 Drawing Sheets

(56) References Cited

OTHER PUBLICATIONS

Wong et al., "Dynamically Loaded Classes as Shared Libraries:an Approach to Improving Virtual Machine Scalability" Proceedings of the International Parallel and Distributed Processing Symposium (IPDPS'03).

Zhu et al., "A Fragile Software Watermarking Algorithm for Content Authentication" IEEE Youth Conference on Information, Computing and Telecommunication, 2009.

* cited by examiner

AUTO DETECTING SHARED LIBRARIES AND CREATING A VIRTUAL SCOPE REPOSITORY

FIELD OF DISCLOSURE

The claimed subject matter relates generally to techniques for improving memory and computational efficiency and, more specifically, to detecting shared libraries and creating a virtual scope repository (VSR) to eliminate duplicate type registration to optimize system performance and memory utilization.

SUMMARY

Provided are techniques for improving memory and computational efficiency by detecting shared libraries and creating a VSR to eliminate duplicate type registration and optimize system performance and memory utilization, all without modification to existing applications. In computer server environments, distinct application packages are often packaged with duplicated libraries or jar files. In this case, distinct applications independently access objects from these duplicated libraries via independent class loader scopes.

Currently, to optimize server performance and memory footprint when there is a duplicated library, the library is removed from the applications, repackaged as a single library and installed into the server environment as a shared library. Then, the applications are reconfigured to use the newly defined shared library. However, this solution that requires application repackaging is not always possible such as when the applications are vendor-supplied. Such an approach may also be expensive, time-consuming and require revalidation and testing of the affected applications.

Provided are techniques for receiving a request to load a first resource corresponding to an application onto a computing system for execution; determining whether or not the first resource is identical to a resource loaded in a virtual scope library (VSR); and, if the first resource is determined not to be identical to any particular resource loaded in the VSR, load the first resource into the VSR; and direct references to the first resource in the application to the first resource loaded in the VSR; and otherwise, if the first resource is determined to be identical to the second resource, direct references to the first resource in the application to the particular resource stored in the VSR.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
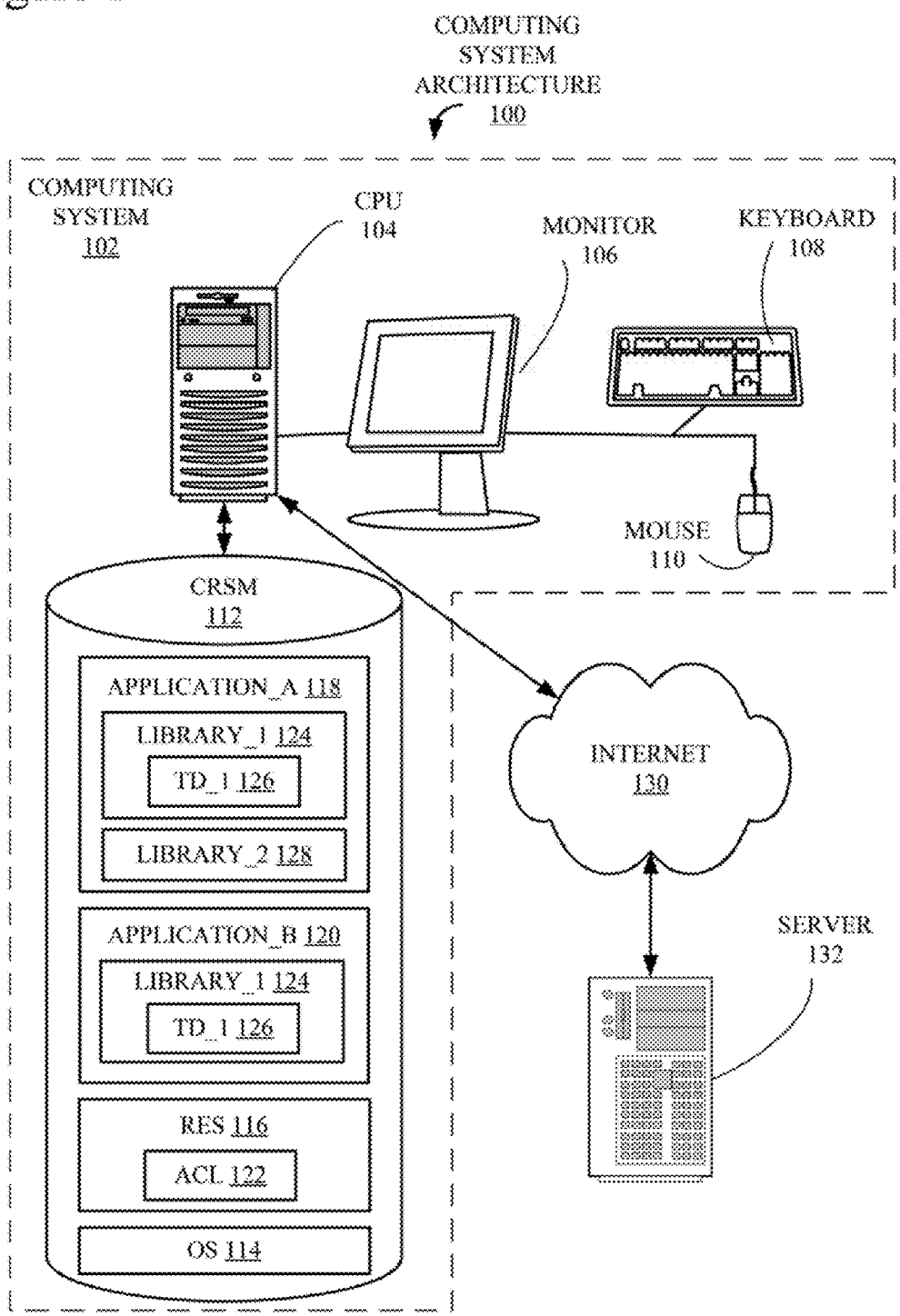
FIG. 1 is an example of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the FIGS., FIG. 1 is a block diagram of an example of a computing system architecture 100 that may incorporate the claimed subject matter. A computing system 102 includes a central processing unit (CPU) 104, coupled to a monitor 106, a keyboard 108 and a pointing device, or "mouse," 110, which together facilitate human interaction with architecture 100 and computing system 102. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown) or wirelessly.

CRSM 112 is illustrated storing logic associated with an operating system (OS) 114, a runtime execution server (RES) 116 and two (2) computer software applications, i.e., an application_A 118 and an application_B 120. RES 116 incorporates an augmented class loader (ACL) 122, which in this example implements functionality associated with the claimed subject matter in addition to functionality associated with a typical class loader. The functionality of ACL 122 is described in more detail below in conjunction with FIGS. 2-5.

Application_A 118 includes two (2) libraries, a library_1 124 and a library_2 128. Library_1 includes a type definition, i.e. TD_1 126. Libraries 124, 128 and included components are used as examples throughout the remainder of the Description. It should be noted that a typical computing system might include more than two (2) applications and a typical application might include more than two libraries, each of which might include more than one type definition but for the sake of simplicity only two applications, two libraries and one type definition are shown. Application_B 120 also includes library_1 124 and TD_1 126. In other words, both applications 118 and 120 include identical instantiations, or copies, of library_1 124 and TD_1 126.

Computing system 102 and CPU 104 are connected to the Internet 130, which is also connected to a server computer 132. Although in this example, computing system 102 and server 132 are communicatively coupled via the Internet 130, they could also be coupled through any number of communication mediums such as, but not limited to, a local area network (LAN) (not shown). Further, it should be noted there are many possible computing system configurations, of which computing system architecture 100 is only one simple example.

Figure 2:
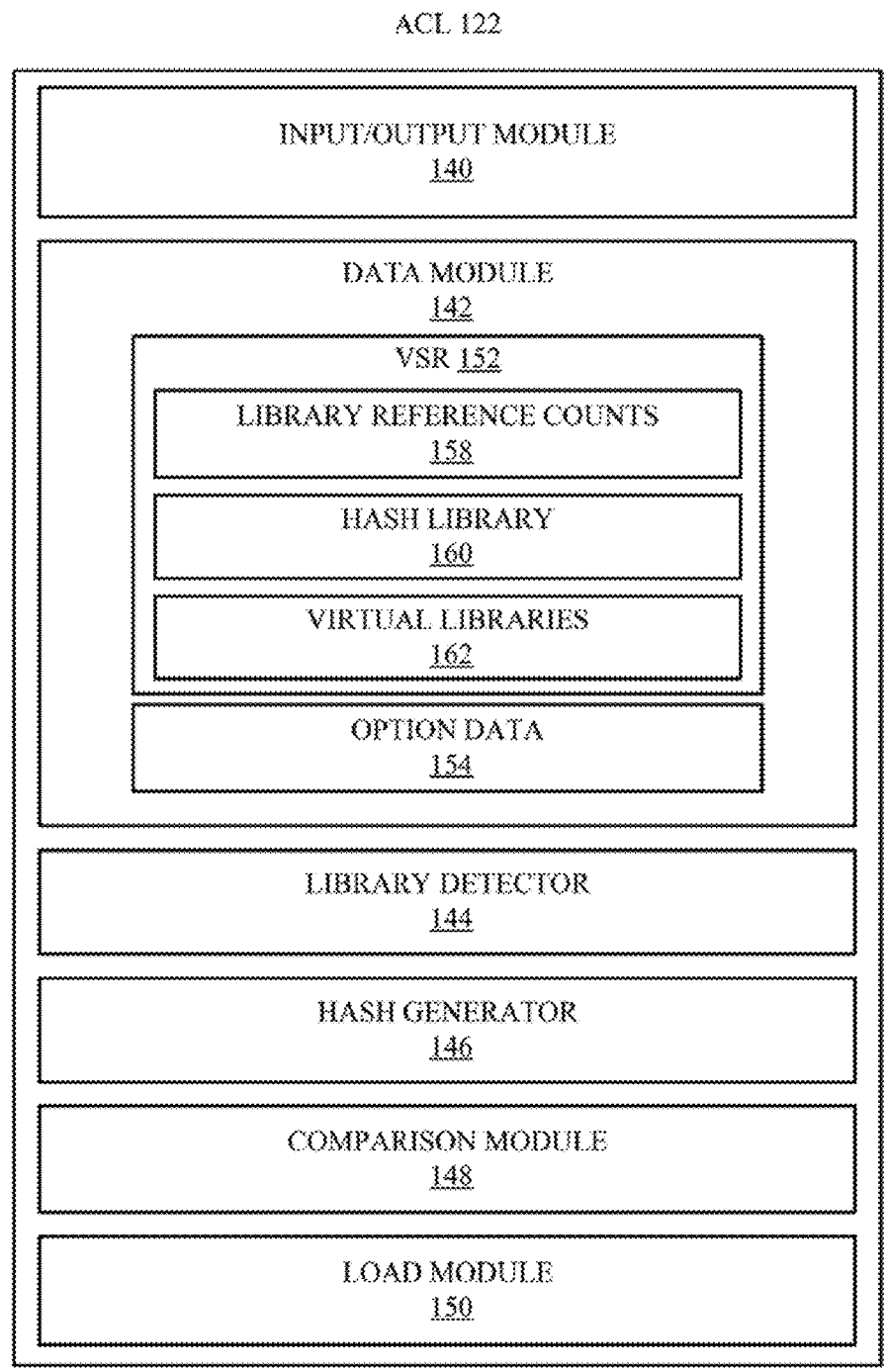
FIG. 2 is a block diagram of an example of an augmented class loader (ACL) first introduced in FIG. 1 that may implement aspects of the claimed subject matter.

FIG. 2 is a block diagram of ACL 122, introduced above in FIG. 1, in greater detail. ACL 122 is one simple example of logic that may implement the claimed subject matter. One with skill in the relevant arts should be able to designing alternative logic for implementing the claimed subject matter. ACL 122 includes an input/output (I/O) module 140, a data module 142, a library detector 144, a hash generator 146, a comparison module 148 and a load module 150. For the sake of the following examples, logic associated with ACL 122 is assumed to execute on one or more processors (not shown) of computing system 102 (FIG. 1) and stored in CRSM 112 (FIG. 1). It should be understood that the claimed subject matter can be implemented in many types of computing systems and data storage structures but, for the sake of simplicity, is described only in terms of computing system 102 and architecture 100 (FIG. 1). Further, the representation of ACL 122 in FIG. 2 is a logical model. In other words, components 140, 142, 144, 146, 148 and 150 may be stored in the same or separates files and loaded and/or executed within architecture 100 either as a single system or as separate processes interacting via any available inter process communication (IPC) techniques.

I/O module 140 handles any communication ACL 122 has with other components of architecture 100 and computing system 102. Data module 142 is a data repository for information and parameters that ACL 122 requires during initialization and normal operation. Examples of the types of information stored in data module 142 include a virtual scope repository (VSR) 152 and option data 154.

It should be noted that although VSR 152 is illustrated as part of ACL 122, it is equally likely that VSR 152 might be implemented as a file or database stored separately. VSR 152 includes library reference counts 158, a hash library 160 and virtual libraries 162. Library reference counts 158 stores information on particular virtual libraries in virtual libraries 162 (see 192, 194, FIG. 3), specifically the number of applications current sharing a particular virtual library. In this manner, a particular library that is no longer in use by any application can be removed from VSR 122. In the alternative, rather than relying upon a count associated with each library loaded to determine whether or not a library is currently in use 152, logic may make use of references to the applications associated with each library (see 260, 262 and 264, FIG. 5).

Hash library 160 stores hash values, or "codes," (see 144), each hash code corresponding to a particular virtual library stored in virtual libraries 162. In conjunction with each stored hash code, are indications of the particular applications associated with the libraries that correspond to the hash codes. The use of hash codes stored in hash library 160 is explained below in conjunction with hash generator 144. It should be understood that in this example hash codes are employed to identify identical libraries but that one with skill in the relevant arts would be able to design other methods of performing the same function.

Option data 154 includes information on various user and administrative preferences that have been set. For example, a user may selectively specify on a library-by-library and/or application-by-application basis that particular libraries and applications are handled normally rather than in accordance with the disclosed technology.

Library detector 144 determines whether not an application being loaded by ACL 122 includes any libraries. If so, hash generator 146 generates and stores in hash library 160, a hash value, or code, for each library encountered during the loading of an application. In this manner, ACL 122 can detect a library that is identical to a library that has previously been loaded by another application.

For example, if ACL 122 loads application_A 118, a hash value for library_1 124 is generated. Comparison module 148 compares the generated hash code to those stored in hash library 160. If the generated hash code is not found, the hash code is stored in hash library 160 and the corresponding library, which in this example is library_1 124, is loaded into virtual libraries 162 as a virtually stored library, or LIB_1 VS (see 192, FIG. 3). If ACL 122 subsequently receives a request to load library_1 124 within application_B 120, a hash code for library_1 124 is generated and compared to the values stored in hash library 160. This time, comparison module 148 detects a match and rather than loading library_1 124 a second time, application_B 120 is provided a reference to LIB_1 VS 192 stored in virtual libraries 162.

Load module 150 provides typical class loading services, subject to the determinations of loading or not loading any particular library in accordance with the claimed subject matter. Functionality associated with components 142, 144, 146, 148, 150, 152, 154, 156, 158, 160 and 162 are described in more detail below in conjunction with FIGS. 3-5.

Figure 3:
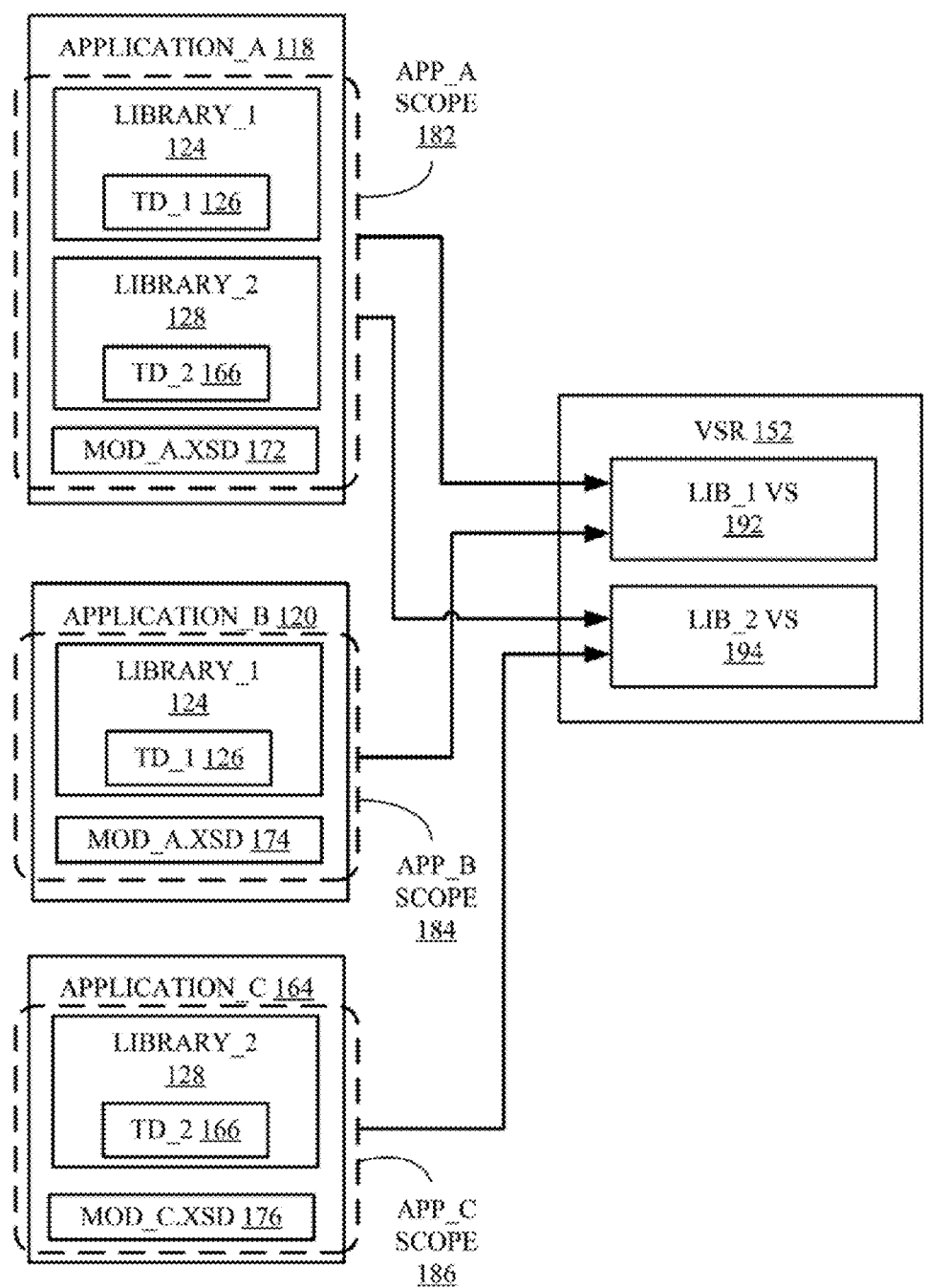
FIG. 3 is a block diagram of several applications, including scopes, and their relationship with a virtual scope library (VSR) implemented in accordance with the claimed subject matter.

FIG. 3 is a block diagram of several applications, i.e. application_A 118 (FIG. 1), application_B 120 (FIG. 1) and an application_C 162. Applications 118, 120 and 164 are illustrated with their relative scopes, i.e. an app_A scope 182, an app_B scope 184 and an app_C scope 186, respectively.

The scope of application_A 118, i.e. app_A scope 182, includes library_1 124 (FIG. 1), which includes type definition TD_1 126 (FIG. 1), library_2 128 (FIG. 1), which includes a type definition TD_2 166, and an artifact, i.e. a mod_A.xsd 172. The scope of application_B 120, i.e. app_B scope 184, includes library_1 124, which includes type definition TD_1 126 and an artifact, i.e. a mod_A.xsd 174. Although artifacts 172 and 174 have the same name and content, they are not shared by applications 118 and 120. In other words, artifact 172 is not visible to application_B 120 and artifact 174 is not visible to application_A 118. The scope of application_C 164, i.e. app_C scope 186, includes library_2 128, which includes type definition TD_2 166 and an artifact, i.e. a mod_C.xsd 176. Application scopes 182, 184 and 186 are used as examples in the following description.

In this example library_1 124, including TD_1 126 in both app_A scope 182 and app_B scope 184 point to, or reference lib_1 VS 192, which is stored in VSR 152 (FIGS. 1 and 2). In a similar fashion, library_2 128, including TD_2 164, reference lib_2 VS 194 in VSR 152. In this manner, the claimed subject matter enables application_A 118 and application_B 120 to share a single library lib_1 VS 192 rather than necessitating that each have a copy of library_1 124 as in FIG. 1. Likewise, application_A 118 and application_C 162 are able to share lib_2 VS 192 rather than maintaining duplicate copies of library_2 128.

Figure 4:
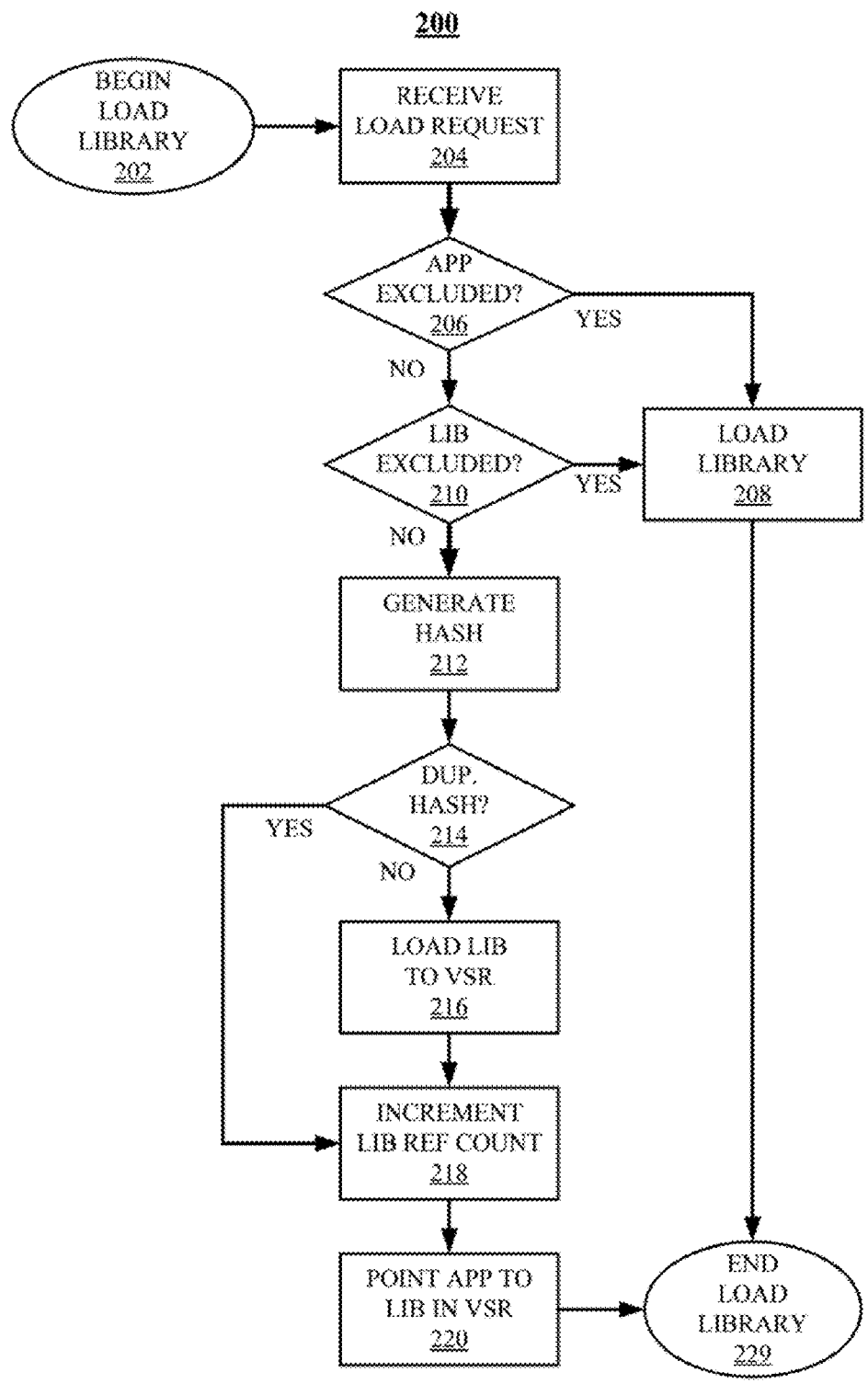
FIG. 4 is a flowchart of a "Load Library" process that may implement aspects of the claimed subject matter.

FIG. 4 is a flowchart of a "Load Library" process 200 that may implement aspects of the claimed subject matter. In this example, logic associated with process 200 is stored on CRSM 112 (FIG. 1) in conjunction with ACL 122 (FIGS. 1 and 2) and is executed on one or more processors (not shown) of CPU 104 (FIG. 1) and computing system 102 (FIG. 1).

Process 200 starts in a "Begin Load Library" block 202 and proceeds immediately to a "Receive Load Request" block 204. During processing associate with block 204, a request is received to load either a library, such as library_1 124 (FIGS. 1 and 3) and library_2 128 (FIGS. 1 and 3), or an artifact that is associated with a library, such as TD_1 126 (FIGS. 1 and 3) and TD_2 166 (FIG. 3). A library or artifact may be loaded when an application, such as application_A 118 (FIGS. 1 and 3), application_B 120 (FIGS. 1 and 3) and application_C 164 (FIG. 3), is either loaded or requests that the library or artifact be loaded or loaded when first referenced within an application. In other words, libraries may be loaded on an application-by-application or library-by-library basis.

In the scenario in which an artifact is loaded, the library associated with the artifact is also typically loaded. In current technology, an application that needs a particular artifact would request that the artifact be loaded. RES 116 (FIG. 1) would find the library in which the artifact resides and load the library into the application's scope. If a second application then requests the same library, RES 116 would load find and load the same library into the second application's scope, resulting in two distinct copies of the library and the artifact in memory. The disclosed technology, as explained below, addresses this issue.

During processing associated with block an "App Excluded?" block 206, a determination is made as to whether or not the application that requested the library or artifact be loaded is an "excluded" application," i.e. an application that an administrator has indicated should maintain all referenced libraries within its own scope. (see 154, FIG. 2). If so, control proceeds to a "Load Library" block 208. During processing associated with block 208, the library being loaded is loaded in a normal fashion, i.e., all included libraries are loaded within the scope of the requesting application.

If during processing associated with block 206 a determination is made that the requesting application is not an "excluded" application, control proceeds to a "Library (Lib.) Excluded?" block 210. During processing associated with block 210, a determination is made as to whether or not the library for which a load request has been received during processing associated with block 204 is an "excluded" library, i.e., a library that an administrator has indicated should remain in the scope of the requesting application. (see 154, FIG. 2). If so, control proceeds to "Load Library" block 208 and the library is loaded as explained above.

If, during processing associated with block 210, a determination is made that the library for which a load request has been received has not been designated as "excluded," control proceeds to a "Generate Hash" block 212. During processing associated with block 212, a hash code is generated based upon the requesting library. The generated hash code is also stored in hash library 160 (FIG. 2). During processing associated with a "Duplicate (Dup.) Hash?" block 214, a determination is made as to whether or not the hash code generated during processing associated with block 212 matches any hash code stored in hash library 160, indicating that the library to be loaded has already been loaded into VSR 152 (FIGS. 2 and 3). It should be noted that hashing as represented in blocks 212 and 214 is only one method of detecting that a duplicate library has been requested. One with skill in the relevant arts should be familiar with other techniques for achieving the same purpose.

If a determination is made, during processing associated with block 214, that the hash code generated during processing associated with block 212 does not match the hash of a previously loaded library, control proceeds to a "Load Lib. To VSR" block 216. During processing associated with block 216, the library for which a load request has been received is loaded into VSR 152. Also stored in VSR 152 and associated with the stored library is the corresponding hash code generated during processing associated with block 212 (see 160, FIG. 2) and an indication of the particular application that initiated the request that the library be loaded. In this manner, a matching hash code can be associated with a particular library and one or more applications.

During processing associated with an "Increment Lib Reference (Ref.) Count" block 218, the count (see 158, FIG. 2) of applications referencing a particular library in VSR 152 is incremented. If block 218 has been reached from block 216, i.e., the library pointed to has already been stored in conjunction with another application; if reached directly via block 214, the library has typically been loaded into VSR 152 by a previous application.

During processing associated with a "Point App to Lib. In VSR" block 220, the application being loaded is provided a pointer or reference to the library stored in VSR 152. Finally, once the application has been loaded during processing associated with block 208 or a pointer to the library has been provided to the requested application during processing associated with block 220, control proceeds to an "End Load Library" block 229 during which process 200 is complete.

Figure 5:
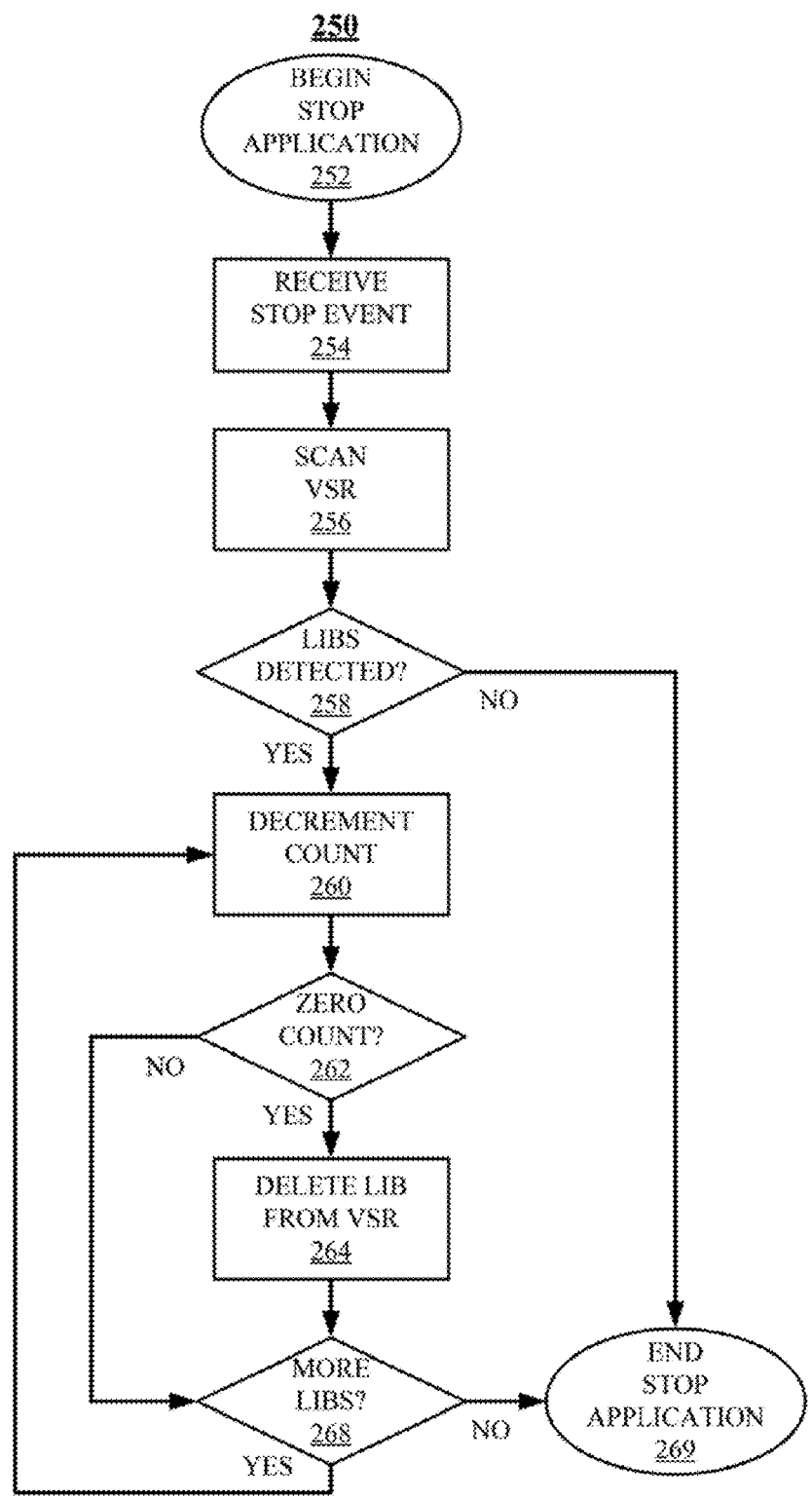
FIG. 5 is a flowchart of a "Stop Application" process that may implement aspects of the claimed subject matter.

FIG. 5 is a flowchart of a "Stop Application" process 250 that may implement aspects of the claimed subject matter. Like process 200 (FIG. 4), in this example, logic associated with process 250 is stored on CRSM 112 (FIG. 1) in conjunction with ACL 122 (FIGS. 1 and 2) and is executed on one or more processors (not shown) of CPU 104 (FIG. 1) and computing system 102 (FIG. 1).

Process 250 starts in a "Begin Stop Application" block 252 and proceeds immediately to a "Receive Stop Event" block 254. During processing associate with block 254, a request is received by RES 116 (FIG. 1) to halt execution of an application such as applications 118, 120 and 164 (FIGS. 1 and 3). During processing associated with a "Scan for VSR" block 256, VSR 152 (FIGS. 1 and 2) is scanned for indications of any libraries that have been loaded in association with the application being halted. As explained above in conjunction with FIG. 2, hash codes are stored in conjunction with indications of the particular applications associated with the libraries that each hash code represents.

During, processing associated with a "Libraries (Libs) Detected?" block 258, a determination is made as to whether or not the application being halted includes any libraries stored in VSR 152. If so, during processing associated with a "Decrement Count" block 260, the count (see 158, FIG. 2) associated with the first library detected during processing associated with block 256 is decremented. In the alternative, rather than relying upon a count associated with each library loaded in VSR 152, process 250 may simply determine whether or not any other applications are referenced with respect to any particular library.

During processing associated with a "Zero Count?" block 262, a determination is made as to whether or not the count associated the library currently being processed has reached zero, i.e. indicating that there are no currently loaded applications that reference the library. If so, during processing associated with a "Delete Lib From VSR" block 264, the library currently being processed is deleted from VSR 152.

Once the library has been deleted during processing associated with block 264, or, if during block 262, a determination is made that the count is not equal to zero, control proceeds to a "More Libs?" block 268. During processing associated with block 268, a determination is made as to whether or not there are more libraries detected during processing associated with block 256 that remain to be processed. If so, processing returns to block 260 and processing continues as described above with respect to the next unprocessed library.

Finally, once a determination has been made that no more libraries remain to be processed during processing associated with block 268, or if during processing associated with block 258 a determination is made that the application being halted does not include any libraries stored in VSR 152, control proceeds to an "End Stop App" block 269 during which process 250 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. An apparatus, comprising:
a processor;
a computer-readable storage medium; and
logic, stored on the computer-readable storage medium and executed on the processor, for performing a method, the method comprising:
receiving a request to load a first resource corresponding to an application onto a computing system for execution, wherein the first resource is a library included in the application:
determining, by scanning a virtual resource library (VSR), whether or not the first resource is identical to any resource of a plurality of resources loaded in the VSR; and,
in response to determining the first resource is not identical to any resource of the plurality of resources loaded in the VSR:
load the first resource into the VSR; and
direct references in the application to the first resource to the first resource loaded in the VSR;
in response to determining the first resource is identical to a second resource of the plurality of resources, direct references to the first resource in the application to the second resource loaded in the VSR;
keep a count associated with each resource loaded in the VSR;
receive a request to halt the application;
scan the VSR for indications whether any resources loaded are associated with the halted; and
decrement the count associated with the resource associated with the application halted.

2. The apparatus of claim 1, wherein the first resource is a computing artifact associated with the application.

3. The apparatus of claim 1, the logic for determining whether or not the first resource is identical to any particular resource in the VSR, comprising logic for:
generating a hash code corresponding to the first resource; and
comparing the hash code to a plurality of hash codes, each hash code of the plurality of hash codes corresponding to a resource in the VSR.

4. The apparatus of claim 1, the logic further comprising logic for detecting that the application is excluded from the method; and loading the first resource into the scope of the application rather than the VSR regardless of whether or not the first resource is determined not to be identical to any resource loaded in the VSR or whether or not such a determination is made.

5. The apparatus of claim 1, the logic further comprising logic for:
detecting that a particular resource stored in the VSR is not pointed to by any currently loaded application; and,
in response to the detecting, deleting the particular resource from the VSR.

6. A computer programming product, comprising:
a non-transitory computer-readable storage medium; and
logic, stored on the computer-readable storage medium for execution on a processor, for:
receiving a request to load a first resource corresponding to an application onto a computing system for execution, wherein the first resource is a library included in the application;
determining, by scanning a virtual resource library (VSR), whether or not the first resource is identical to any resource of a plurality of resources currently loaded in the VSR; and,
in response to determining the first resource is not identical to any resource of the plurality of resources loaded in the VSR:
load the first resource into the VSR; and
direct references in the application to the first resource to the first resource loaded in the VSR;
in response to determining the first resource is identical to a second resource of the plurality of resources, direct references to the first resource in the application to the second resource loaded in the VSR;
keep a count associated with each resource loaded in the VSR;
receive a request to halt the application;
scan the VSR for indications whether any resources loaded are associated with the application being halted; and
decrement the count associated with the resource associated with the application halted.

7. The computer programming product of claim 6, wherein the first resource is a computing artifact associated with the application.

8. The computer programming product of claim. 6, the logic for determining whether or not the first resource is identical to any particular resource in the VSR, comprising logic for:
generating a hash code corresponding to the first resource; and
comparing the hash code to a plurality of hash codes, each hash code of the plurality of hash codes corresponding to a resource in the VSR.

9. The computer programming product of claim 6, the logic further comprising logic for detecting that the application is excluded from the method; and loading the first resource into the scope of the application rather than the VSR regardless of whether or not the first resource is determined not to he identical to any resource loaded in the VSR or whether or not such a determination is made.

10. The computer programming product of claim 6, the logic further comprising logic for:
detecting that a particular resource stored in the VSR is not pointed to by any currently loaded application; and,
in response to the detecting, deleting the particular resource from the VSR.

11. An application loader for a computing system, comprising logic, stored on a non-transitory computer-readable storage medium for execution on a processor, for:
receiving a request to load a first resource corresponding to an application onto a computing system for execution, wherein the first resource is a library included in the application;
determining, by scanning a virtual resource library (VSR), whether or not the first resource is identical to any resource of a plurality of resources currently loaded in the VSR; and,
in response to determining the first resource is not identical to any resource of the plurality of resources loaded in the VSR;
load the first resource into the VSR; and
direct references in the application to the first resource to the first resource loaded in the VSR;
in response to determining the first resource is identical to a second resource of the plurality of resources, direct references to the first resource in the application to the second resource loaded in the VSR;
keep a count associated with each resource loaded in the VSR;
receive a request to halt the application;

scan the VSR for indications whether any resources loaded are associated with the application being halted; and decrement the count associated with the. resource associated with the application halted.

12. The application loader of claim 11, wherein the first resource is a computing artifact associated with the application.

13. The application loader of claim 11, the logic for determining whether or not glee first resource is identical to any particular resource in the VSR, comprising logic for:

generating a hash code corresponding to the first resource; and comparing the hash code to a plurality of hash codes, each hash code of the plurality of hash codes corresponding to a resource in the VSR.

14. The application loader of claim 11, the logic further comprising logic for detecting that the application is excluded from the method;

and loading the first resource into the scope of the application rather than the VSR regardless of whether or not the first resource is determined not to be identical to any resource loaded in the VSR or whether or not such a determination is made.

15. The application loader of claim 11, the logic further comprising logic for:

detecting that a particular resource stored in the VSR is not pointed to by any currently loaded application; and, in response to the detecting, deleting the particular resource from the VSR.

* * * * *